(12) United States Patent
Mountz (10) Patent No.: US 8,608,190 B2
(45) Date of Patent: Dec. 17, 2013

(54) TELESCOPING HANDLE ASSEMBLY AND STROLLER EQUIPPED WITH THE SAME

(75) Inventor: Jonathan Mountz, Birdsboro, PA (US)

(73) Assignee: Wonderland Nurserygoods Company Limited, Central (HK)

( * ) Notice: Subject to any disclaimer, the term of this patent is extended or adjusted under 35 U.S.C. 154(b) by 0 days.

(21) Appl. No.: 13/414,683

(22) Filed: Mar. 7, 2012

(65) Prior Publication Data

US 2012/0228854 A1    Sep. 13, 2012

Related U.S. Application Data

(60) Provisional application No. 61/464,735, filed on Mar. 8, 2011.

(51) Int. Cl.
*B62B 1/00* (2006.01)

(52) U.S. Cl.
USPC .......................... 280/655; 280/655.1; 280/647

(58) Field of Classification Search
USPC ......... 280/33.993, 47.38, 639, 642, 643–644, 280/647–650, 658; 297/195.13, 218.1, 297/218.2, 218.3, 219.12, 440.11
See application file for complete search history.

(56) References Cited

U.S. PATENT DOCUMENTS

| | | | | |
|---|---|---|---|---|
| 5,167,069 A * | 12/1992 | Quinn | ............................ | 30/527 |
| 5,205,579 A * | 4/1993 | Kato et al. | .................... | 280/642 |
| 5,348,325 A * | 9/1994 | Abrams | ......................... | 280/40 |
| 5,511,441 A * | 4/1996 | Arai | ............................. | 74/501.6 |
| 5,516,142 A * | 5/1996 | Hartan | ......................... | 280/642 |
| 5,630,250 A * | 5/1997 | Chou | ........................... | 16/113.1 |
| 5,979,928 A * | 11/1999 | Kuo | .............................. | 280/642 |
| 6,068,284 A * | 5/2000 | Kakuda | ........................ | 280/642 |
| 6,102,431 A * | 8/2000 | Sutherland et al. | ........... | 280/642 |
| 6,478,328 B1 * | 11/2002 | Yeh et al. | ...................... | 280/650 |
| 6,550,801 B1 | 4/2003 | Newhard | | |
| 6,692,015 B2 * | 2/2004 | Perego | ......................... | 280/647 |
| 6,854,758 B2 * | 2/2005 | Hou et al. | ..................... | 280/642 |
| 7,694,980 B2 * | 4/2010 | Dotsey et al. | ............ | 280/47.371 |

FOREIGN PATENT DOCUMENTS

GB    2444427 B    12/2009

* cited by examiner

*Primary Examiner* — John Walters
*Assistant Examiner* — James Triggs
(74) *Attorney, Agent, or Firm* — Winston Hsu; Scott Margo (57) ABSTRACT

A telescoping handle assembly includes a first handle, a second handle, a first coupling member, a second coupling member and a driving member. The second handle is movably disposed in the first handle. The first coupling member is movably disposed in the first handle and the second handle. The second coupling member is movably disposed in the second handle. The driving member is coupled to the second coupling member and used for driving the second coupling member to move from a first position to a second position. When the second coupling member is located at the first position, the second coupling member is capable of moving with respect to the first coupling member. When the second coupling member is located at the second position, the first coupling member and the second coupling member are capable of moving together while the driving member is driven.

27 Claims, 10 Drawing Sheets

FIG. 10

TELESCOPING HANDLE ASSEMBLY AND STROLLER EQUIPPED WITH THE SAME

CROSS REFERENCE TO RELATED APPLICATIONS

This application claims the benefit of U.S. Provisional Application No. 61/464,735, which was filed on Mar. 8, 2011, and is incorporated herein by reference.

BACKGROUND OF THE INVENTION

1. Field of the Invention

The invention relates to a telescoping handle assembly and, more particularly, to a stroller equipped with a telescoping handle assembly which can be used in a one-hand fold mechanism.

2. Description of the Prior Art

In simplifying the experience of folding a stroller, it is necessary to eliminate as many steps in the physical process of folding as possible. Many strollers have one-hand fold mechanisms which allow the caretaker to grasp the release actuator and then fold the stroller all in one simple motion. However, these mechanisms are typically mounted to strollers with fixed frame handles or pivoting frame handles.

Telescoping handle strollers currently do not have the luxury of a one hand fold mechanism. The caretaker must go through a series of physical steps to release the locking mechanism which can be complicated and frustrating. A telescoping handle is often desired on a stroller because its adjustability allows it to accommodate a large range of caretaker heights and stride lengths while also allowing for a considerably compact fold. A telescoping handle also provides a more clean-looking, simplified solution for a height-adjustable handle, compared to that of a rotating handle. A one-hand fold mechanism allows for an easy, simple means of folding a stroller in any situation where such a convenience would be useful.

Therefore, it is important to design a stroller with both a telescoping handle and a one-hand fold mechanism in order to maximize the convenience, intuitive perception, aesthetic benefits and positive user-experience of the stroller.

SUMMARY OF THE INVENTION

An objective of the invention is to provide a telescoping handle assembly which can be used in a one-hand fold mechanism and a stroller equipped with the telescoping handle assembly.

According to one embodiment of the invention, a telescoping handle assembly comprises a first handle, a second handle, a first coupling member, a second coupling member and a driving member. An end of the second handle is movably disposed in the first handle. The first coupling member is movably disposed in the first handle and the second handle. The second coupling member is movably disposed in the second handle. The driving member is coupled to the second coupling member and used for driving the second coupling member to move from a first position to a second position. When the second coupling member is located at the first position, the second coupling member is capable of moving with respect to the first coupling member. When the second coupling member is located at the second position, the first coupling member and the second coupling member are capable of moving together while the driving member is driven.

According to another embodiment of the invention, a stroller comprises a frame and a telescoping handle assembly. The telescoping handle assembly comprises a first handle, a second handle, a first coupling member, a second coupling member, an engaging member and a driving member. An end of the second handle is movably disposed in the first handle. The first coupling member is movably disposed in the first handle and the second handle. The second coupling member is movably disposed in the second handle. The engaging member is connected to the first coupling member and locked with the frame. The driving member is coupled to the second coupling member and used for driving the second coupling member to move from a first position to a second position. When the second coupling member is located at the first position, the second coupling member is capable of moving with respect to the first coupling member such that the second handle is capable of moving with respect to the first handle. When the second coupling member is located at the second position, the first coupling member, the second coupling member and the engaging member are capable of moving together while the driving member is driven, so as to unlock the engaging member from the frame.

As mentioned in the above, when the driving member is driven, the second coupling member will be driven from the first position to the second position such that the second coupling member, the first coupling member and the engaging member all begin to move together while the driving member is driven continuously. Consequently, the engaging member will be unlocked from the frame of the stroller. Then, the frame and the telescoping handle assembly can be folded up by one hand of the caretaker. On the other hand, when the driving member is released, the second coupling member will move from the second position to the first position such that the second coupling member is capable of moving with respect to the first coupling member. Afterward, the second handle is allowed to be freely adjusted within the first handle. Once the first handle and the second handle are locked together again, the second coupling member will be engaged with the first coupling member and the engaging member will be unlocked from the frame whenever the driving member is driven, regardless of the handle adjustment position between the first handle and the second handle. Accordingly, both the telescoping handle assembly and the one-hand fold mechanism can be implemented in the stroller of the invention so as to maximize the convenience, intuitive perception, aesthetic benefits and positive user-experience of the stroller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
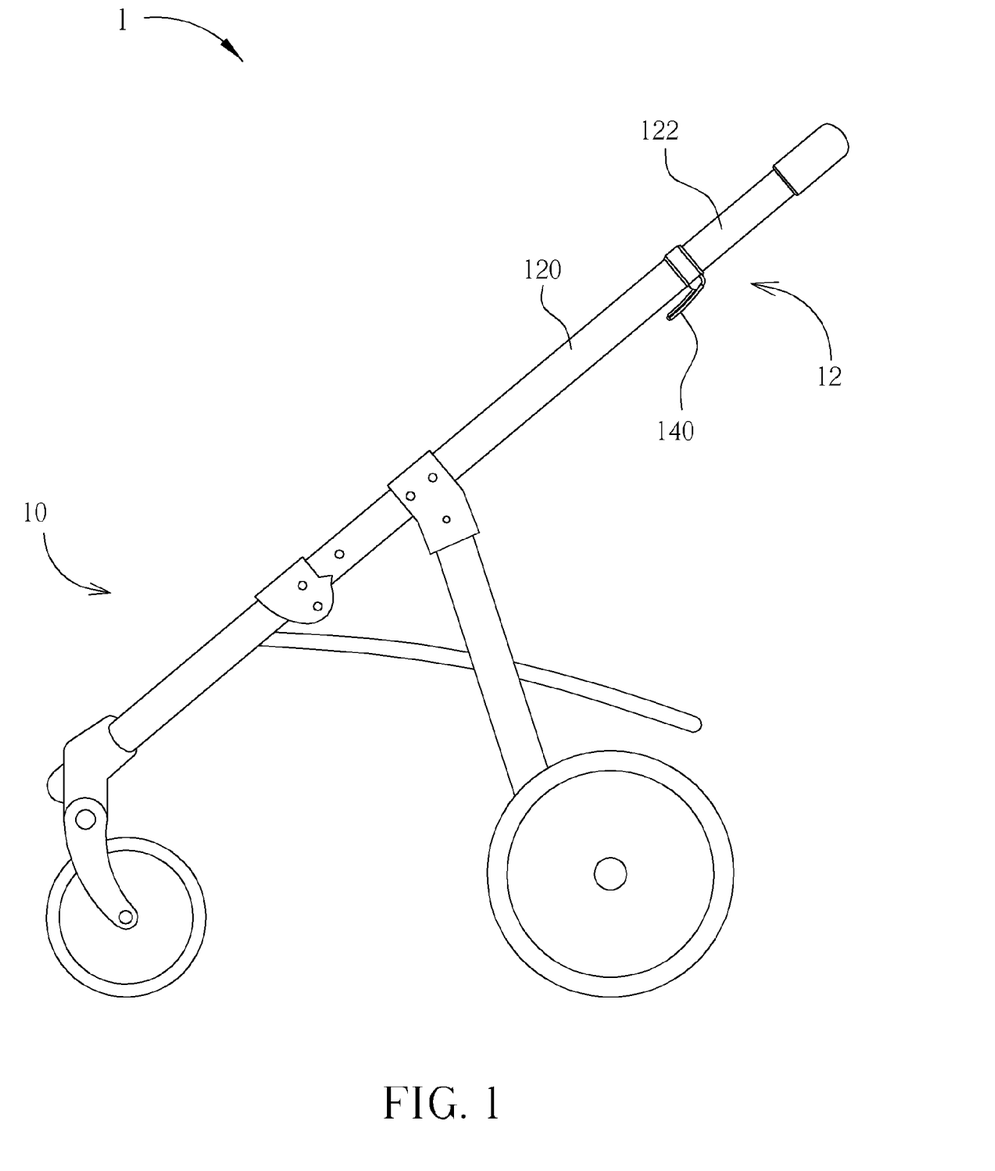
FIG. 1 is a side view illustrating a stroller with a telescoping handle assembly according to an embodiment of the invention.
Figure 2:
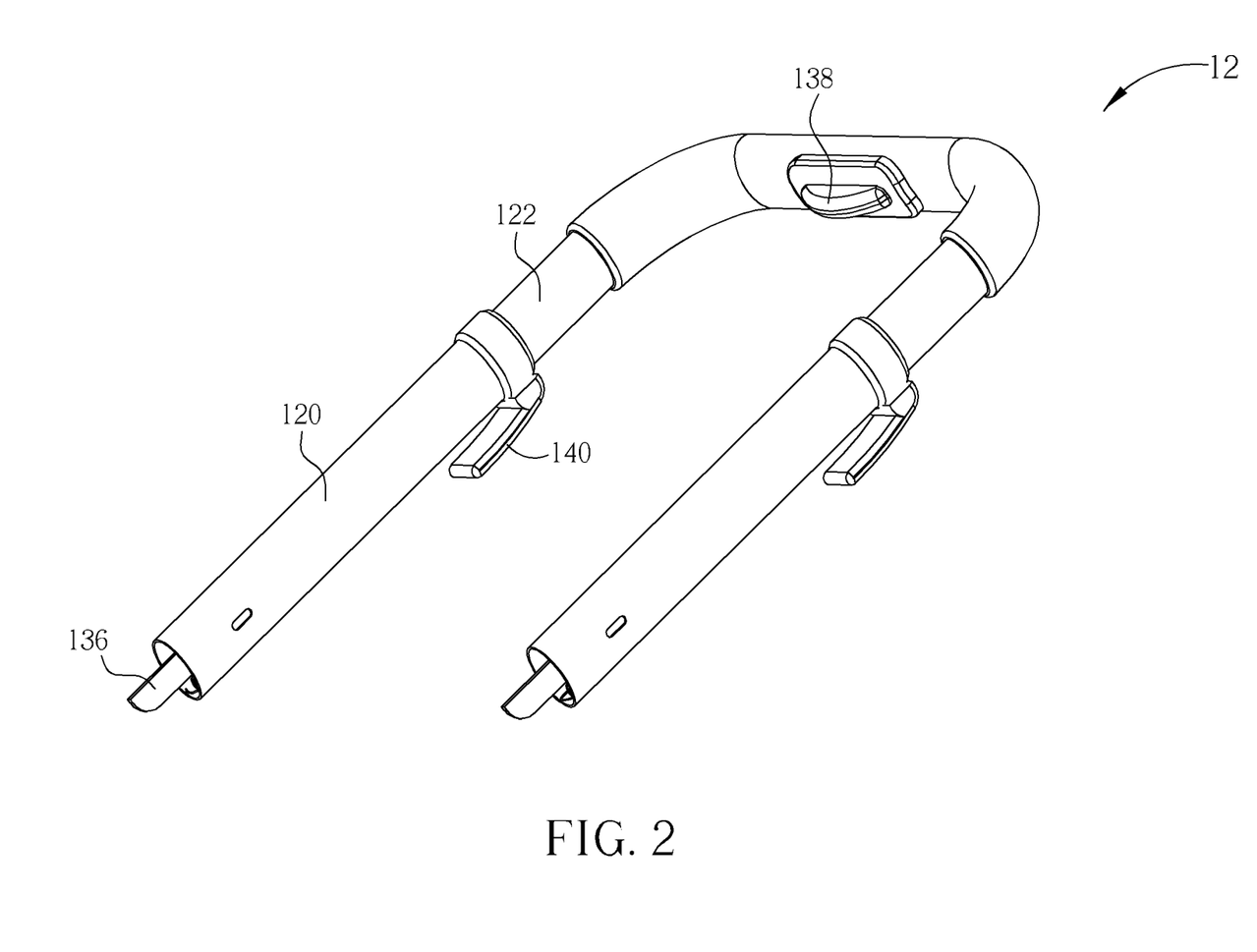
FIG. 2 is a perspective view illustrating the telescoping handle assembly shown in FIG. 1.
Figure 3:
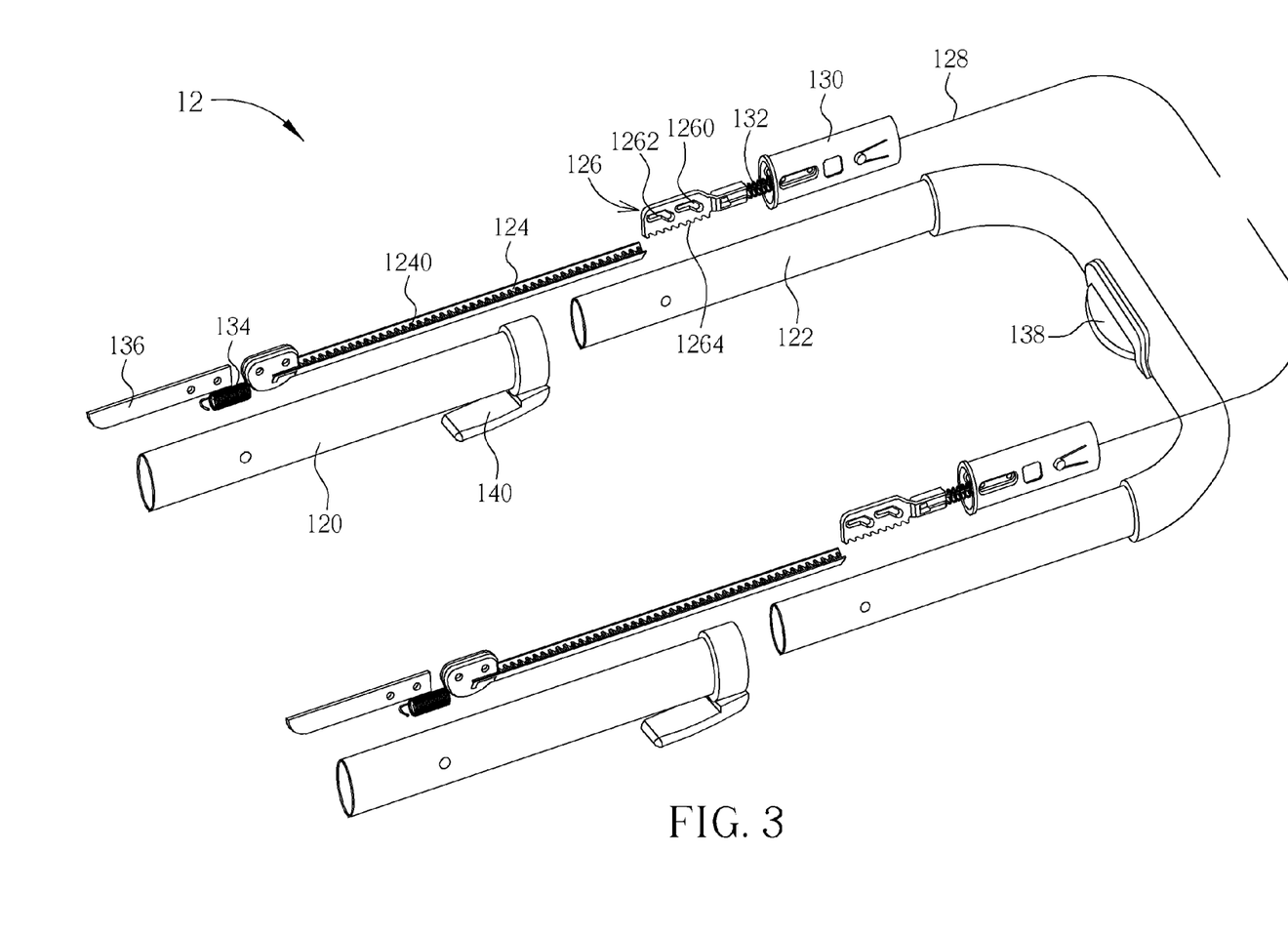
FIG. 3 is an exploded view illustrating the telescoping handle assembly shown in FIG. 2.
Figure 4:
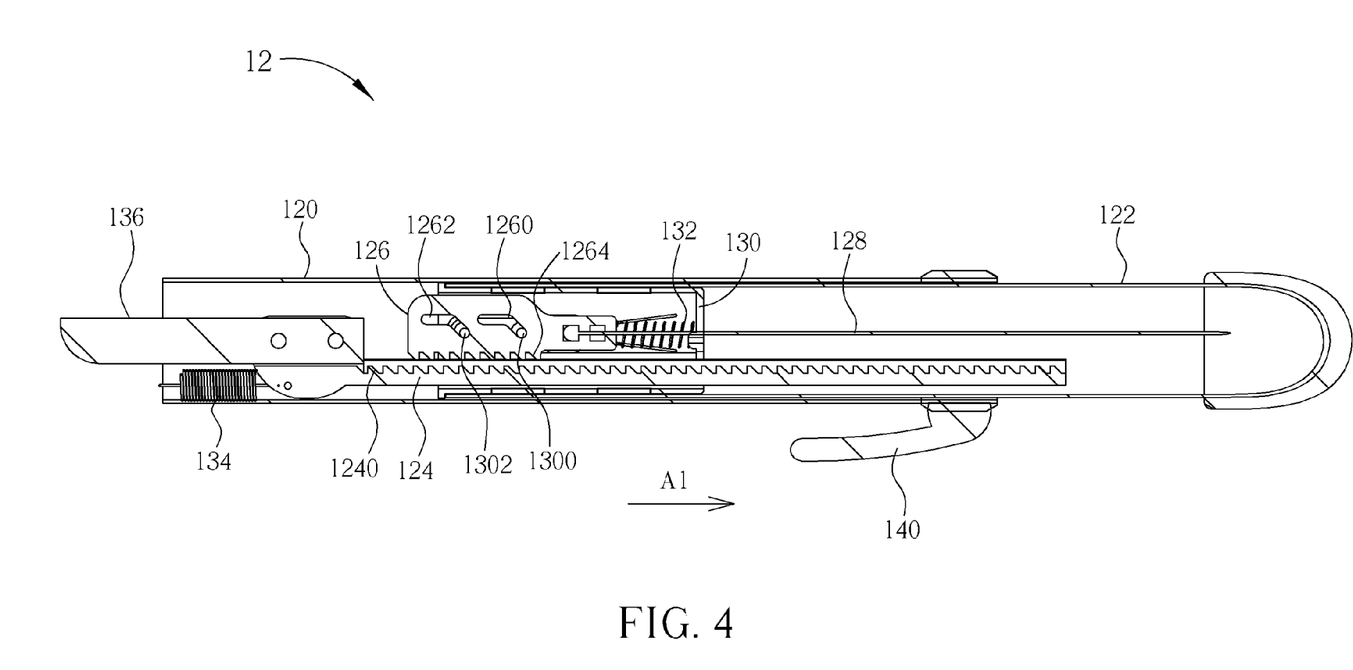
FIG. 4 is a cross-sectional view illustrating one side of the telescoping handle assembly shown in FIG. 2, wherein the second coupling member is located at a first position.
Figure 5:
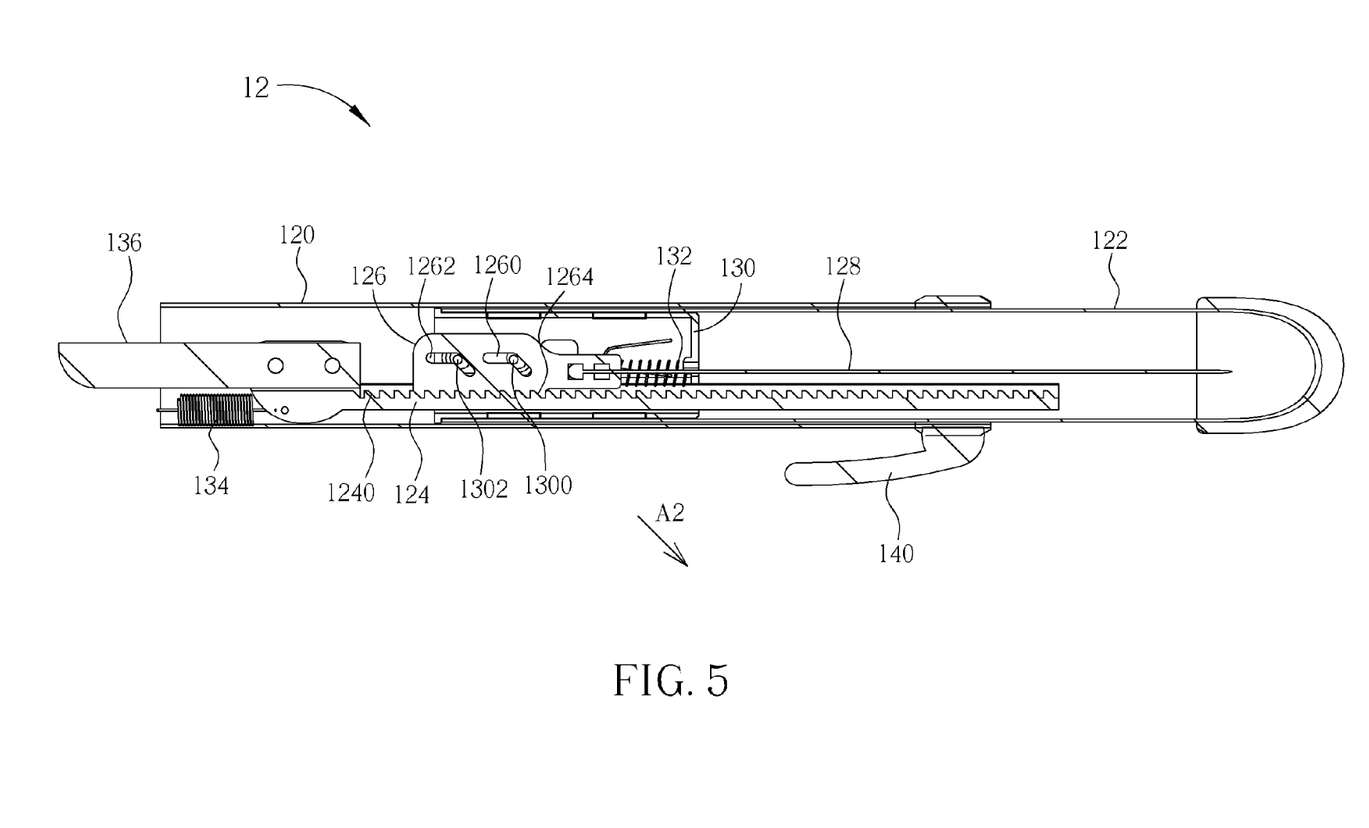
FIG. 5 is a cross-sectional view illustrating the second coupling member moving from the first position shown in FIG. 4 to a second position.
Figure 6:
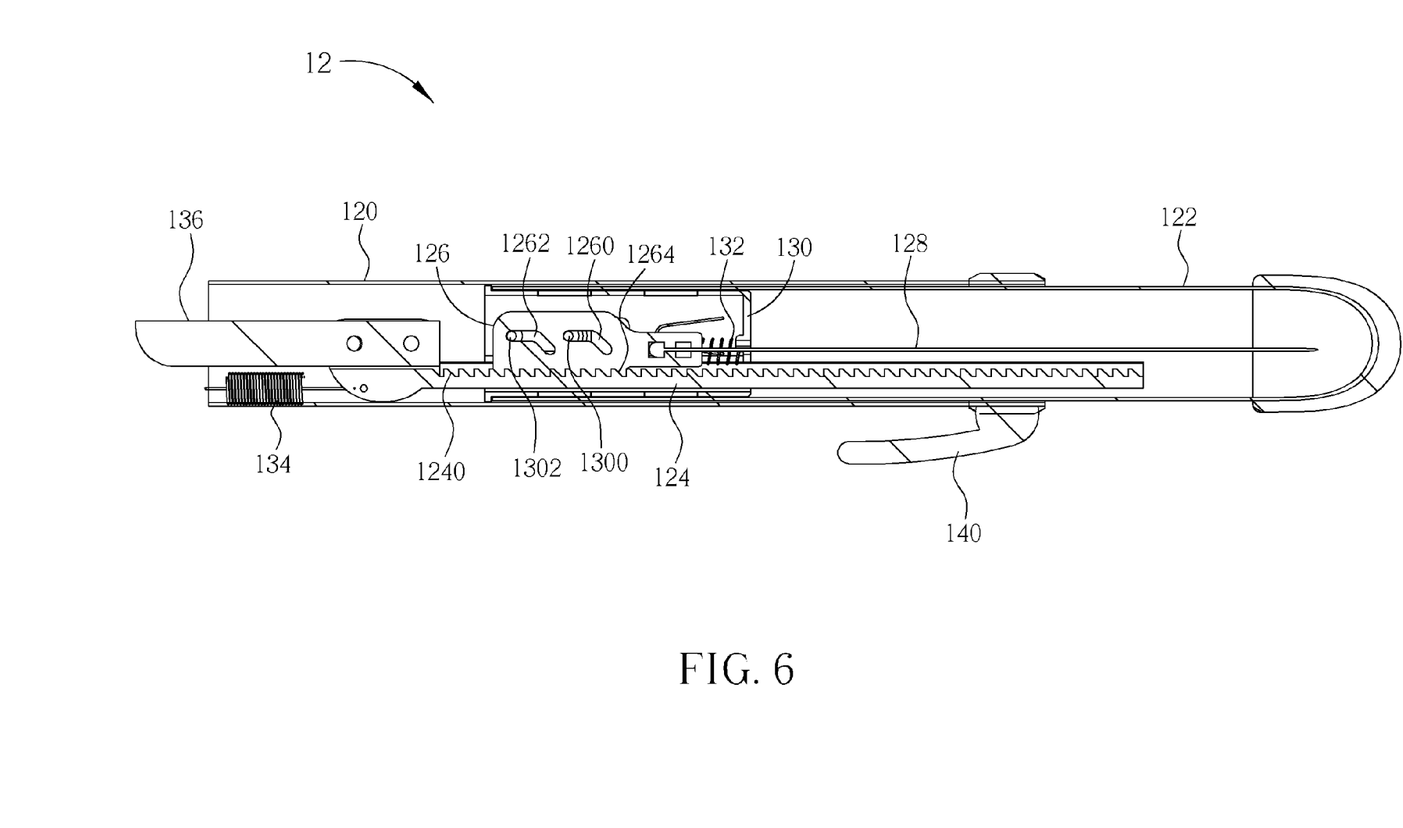
FIG. 6 is a cross-sectional view illustrating the first coupling member, the second coupling member and the engaging member moving together while the driving member is driven in FIG. 5.
Figure 7:
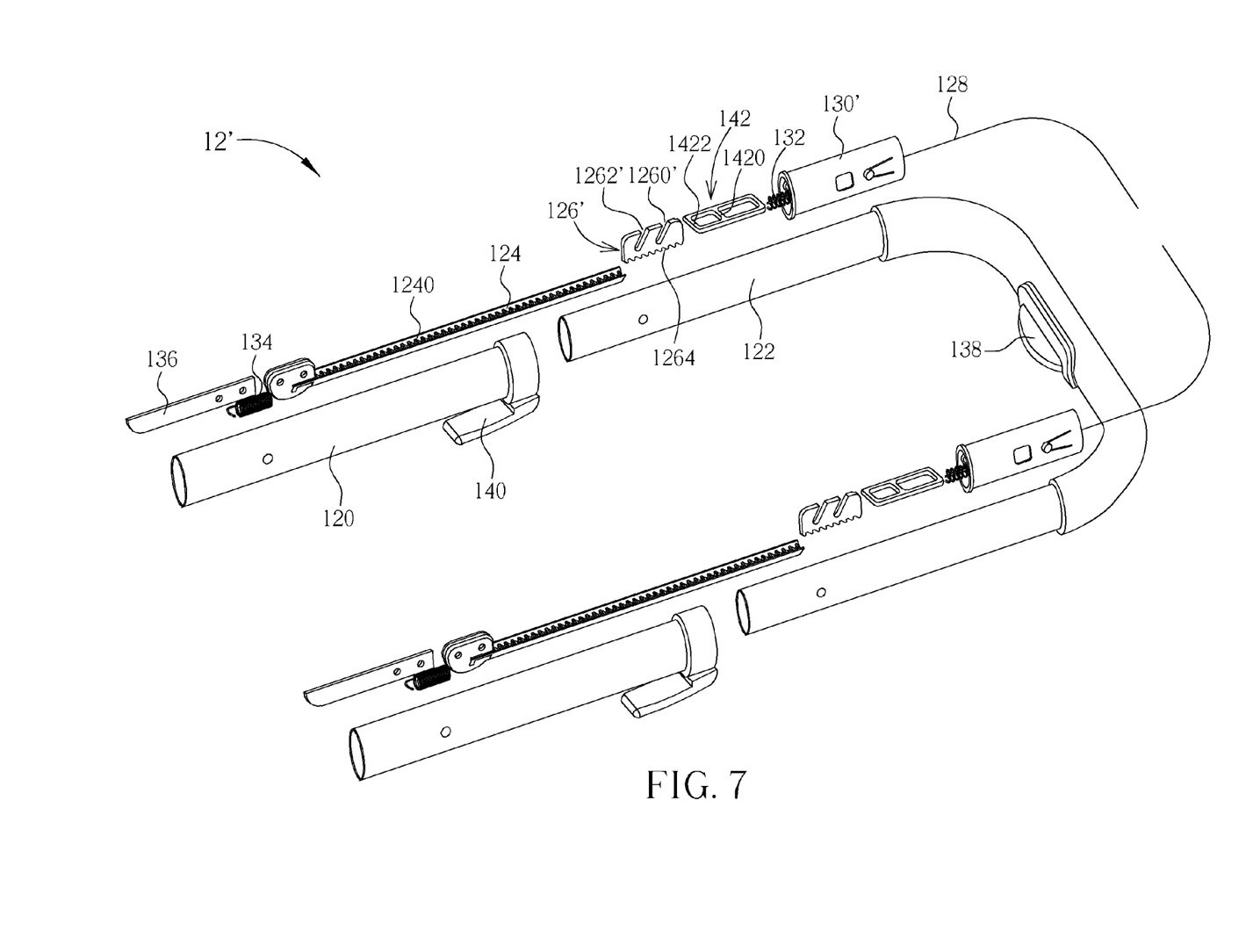
FIG. 7 is an exploded view illustrating a telescoping handle assembly according to another embodiment of the invention.

Referring to FIGS. 1 to 6, FIG. 1 is a side view illustrating a stroller 1 with a telescoping handle assembly 12 according to an embodiment of the invention; FIG. 2 is a perspective view illustrating the telescoping handle assembly 12 shown in FIG. 1; FIG. 3 is an exploded view illustrating the telescoping handle assembly 12 shown in FIG. 2; FIG. 4 is a cross-sectional view illustrating one side of the telescoping handle assembly 12 shown in FIG. 2, wherein the second coupling member 126 is located at a first position; FIG. 5 is a cross-sectional view illustrating the second coupling member 126 moving from the first position shown in FIG. 4 to a second position; and FIG. 6 is a cross-sectional view illustrating the first coupling member 124, the second coupling member 126 and the engaging member 136 moving together while the driving member 128 is driven in FIG. 5.

As shown in FIG. 1, the stroller 1 comprises a frame 10 and a telescoping handle assembly 12. In this embodiment, the telescoping handle assembly 12 is substantially symmetric. As shown in FIGS. 2 to 4, since the telescoping handle assembly 12 is substantially symmetric, each side of the telescoping handle assembly 12 comprises a first handle 120, a first coupling member 124, a second coupling member 126, a driving member 128, a sleeve 130, two resilient members 132, 134, an engaging member 136, and a clamping device 140. Furthermore, telescoping handle assembly 12 comprises a second handle 122, which is U-shaped, and an actuating member 138, which may be, but not limited to, a one-hand fold actuator centrally disposed on the second handle 122. In practical applications, the first handle 120 and the second handle 122 may be formed of steel, aluminum or the like.

An end of the second handle 122 is movably disposed in the first handle 120 such that the second handle 122 can slide up and down with respect to the first handle 120. The clamping device 140 is disposed on the first handle 120 and used for locking or unlocking the second handle 122 relative to the first handle 120. Accordingly, the second handle 122 is fixed relative to the first handle 120 while the clamping device 140 is locked and the second handle 122 is allowed to be freely adjusted within the first handle 120 while the clamping device 140 is unlocked.

The sleeve 130 is disposed in the end of the second handle 122. The first coupling member 124 is movably disposed in the first handle 120 and the second handle 122 and passes through the sleeve 130. The second coupling member 126 is movably disposed in the sleeve 130. In this embodiment, the sleeve 130 has a first guiding portion 1300 and a second guiding portion 1302 adjacent to the first guiding portion 1300 therein, and the second coupling member 126 has a first slot 1260 and a second slot 1262 adjacent to the first slot 1260 formed thereon. As shown in FIG. 4, when the second coupling member 126 is disposed in the sleeve 130, the first guiding portion 1300 and the second guiding portion 1302 are disposed in the first slot 1260 and the second slot 1262, respectively. The first slot 1260 and the second slot 1262 both are nonlinear such that the second coupling member 126 is capable of moving in at least two directions relative to the first guiding portion 1300 and the second guiding portion 1302 of the sleeve 130. In this embodiment, the first slot 1260 and the second slot 1262 both are, but not limited to, V-shaped such that the second coupling member 126 is capable of moving in two directions (as shown in FIGS. 4 to 6) relative to the first guiding portion 1300 and the second guiding portion 1302 of the sleeve 130. In another embodiment, the first slot 1260 and the second slot 1262 both may be curved or other shapes based on practical applications. In this embodiment, the first guiding portion 1300 and the second guiding portion 1302 may be, but not limited to, rivets used for fastening the sleeve 130 and the second coupling member 126.

The driving member 128 is coupled to the second coupling member 126 and used for driving the second coupling member 126 to move from a first position (as shown in FIG. 4) to a second position (as shown in FIG. 5). In this embodiment, the driving member 128 is a cable disposed in the second handle 122 and an end of the driving member 128 is connected to the actuating member 138 such that the driving member 128 can be drawn to drive the second coupling member 126 to move from the first position (as shown in FIG. 4) to the second position (as shown in FIG. 5) while the actuating member 138 is activated. As shown in FIG. 4, when the second coupling member 126 is located at the first position, the second coupling member 126 is capable of moving with respect to the first coupling member 124. As shown in FIG. 5, when the second coupling member 126 is located at the second position, the engaging member 136, the first coupling member 124 and the second coupling member 126 are capable of moving together while the driving member 128 is drawn. In this embodiment, the first coupling member 124 has a plurality of first teeth 1240 and the second coupling member 126 has a plurality of second teeth 1264 such that the first coupling member 124 and the second coupling member 126 are capable of being engaged with each other through the first teeth 1240 and the second teeth 1264 while the second coupling member 126 is located at the second position shown in FIG. 5. In other words, the second coupling member 126 is disengaged from the first coupling member 124 when the second coupling member 126 is located at the first position shown in FIG. 4 and the second coupling member 126 is engaged with the first coupling member 124 when the second coupling member 126 is located at the second position shown in FIG. 5. In other embodiment, the first teeth 1240 and the second teeth 1264 may be replaced by other engagement structures (e.g. a couple of hook structure and ring structure) so as to engage the first coupling member 124 and the second coupling member 126 or disengage the second coupling member 126 from the first coupling member 124.

As shown in FIG. 4, the resilient member 132 is slid over an end of the driving member 128 and the end of the driving member 128 passes through the sleeve 130 and is connected to the second coupling member 126, wherein one end of the resilient member 132 abuts against the second coupling member 126 and the other end of the resilient member 132 abuts against an inner wall of the sleeve 130. The resilient member 134 is disposed in the first handle 120, wherein one end of the resilient member 134 is connected to the first coupling member 124 and the other end of the resilient member 134 is connected to the first handle 120. The engaging member 136 is connected to the first coupling member 124 and locked with the frame 10. In this embodiment, the engaging member 136 may be fastened on the first coupling member 124 by rivets. In this embodiment, the resilient members 132, 134 may be, but not limited to, springs.

As mentioned in the above, when a caretaker wants to adjust the length of the telescoping handle assembly 12, he or she has to unlocked the clamping device 140 first, pulls or pushes the second handle 122 relative to the first handle 120 to a desired position, and then locks the clamping device 140.

As the caretaker wants to fold up the stroller 1, he or she has to activate the actuating member 138 by one hand so as to draw the driving member 128 parallel to the longitudinal axis of the second handle 122 and the second coupling member 126, which is coupled to the end of the driving member 128, is driven in the same direction indicated by an arrow A1 shown in FIG. 4. As the second coupling member 126 is pulled, the first slot 1260 and the second slot 1262 molded therein drive it into the first coupling member 124 in a direction indicated by an arrow A2 shown in FIG. 5, causing the second teeth 1264 to be fully engaged with the first teeth 1240 of the first coupling member 124. Once the second coupling member 126 and the first coupling member 124 are engaged, as the driving member 128 continues to be drawn, the second coupling member 126 is no longer driven into the first coupling member 124 but rather parallel to the longitudinal axis of the second handle 122 because the first slot 1260 and the second slot 1262 change direction. This then causes the first coupling member 124 and the engaging member 136 to begin to move together with the second coupling member 126 driven by the driving member 128. The second coupling member 126, the first coupling member 124 and the engaging member 136 all continue to move as one until the limits of the first slot 1260 and the second slot 1262 in the second coupling member 126 are reached, as shown in FIG. 6. At this time, the engaging member 136 is unlocked from the frame 10 and the caretaker can fold up the stroller 1 by one hand accordingly.

After the actuating member 138 is activated to draw the driving member 128, both the first coupling member 124 and the second coupling member 126 are biased in the downward direction, with extension and compression resilient members 134, 132 respectively. Therefore, once the driving member 128 is released, the first coupling member 124 and the second coupling member 126 will be pulled/pushed back down by their corresponding resilient members 132, 134 respectively. As the second coupling member 126 moves back down, it begins to travel backward over its molded-in first slot 1260 and second slot 1262, causing it to disengage from the first coupling member 124. When the driving member 128 is fully released, the first coupling member 124 and the second coupling member 126 are completely free from contacting one another and the engaging member 136 is locked with the frame 10, allowing the second handle 122 to be freely adjusted within the first handle 120. Once the first handle 120 and the second handle 122 are locked together again by the clamping device 140, the first coupling member 124 and the second coupling member 126 will engage and the engaging member 136 will be released whenever the actuating member 138 is activated, regardless of the handle adjustment position between the first handle 120 and the second handle 122.

Figure 8:
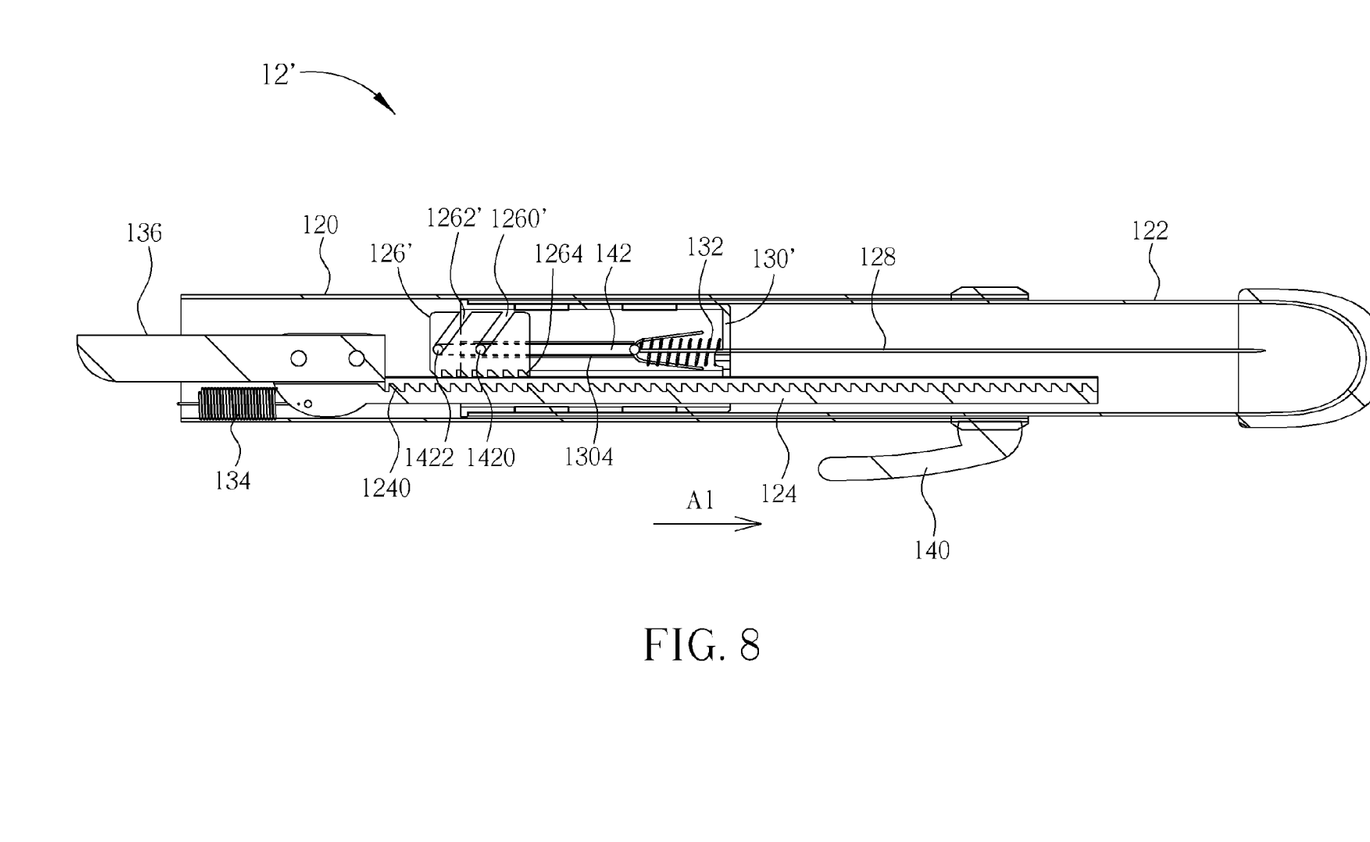
FIG. 8 is a cross-sectional view illustrating one side of the telescoping handle assembly shown in FIG. 7, wherein the second coupling member is located at a first position.
Figure 9:
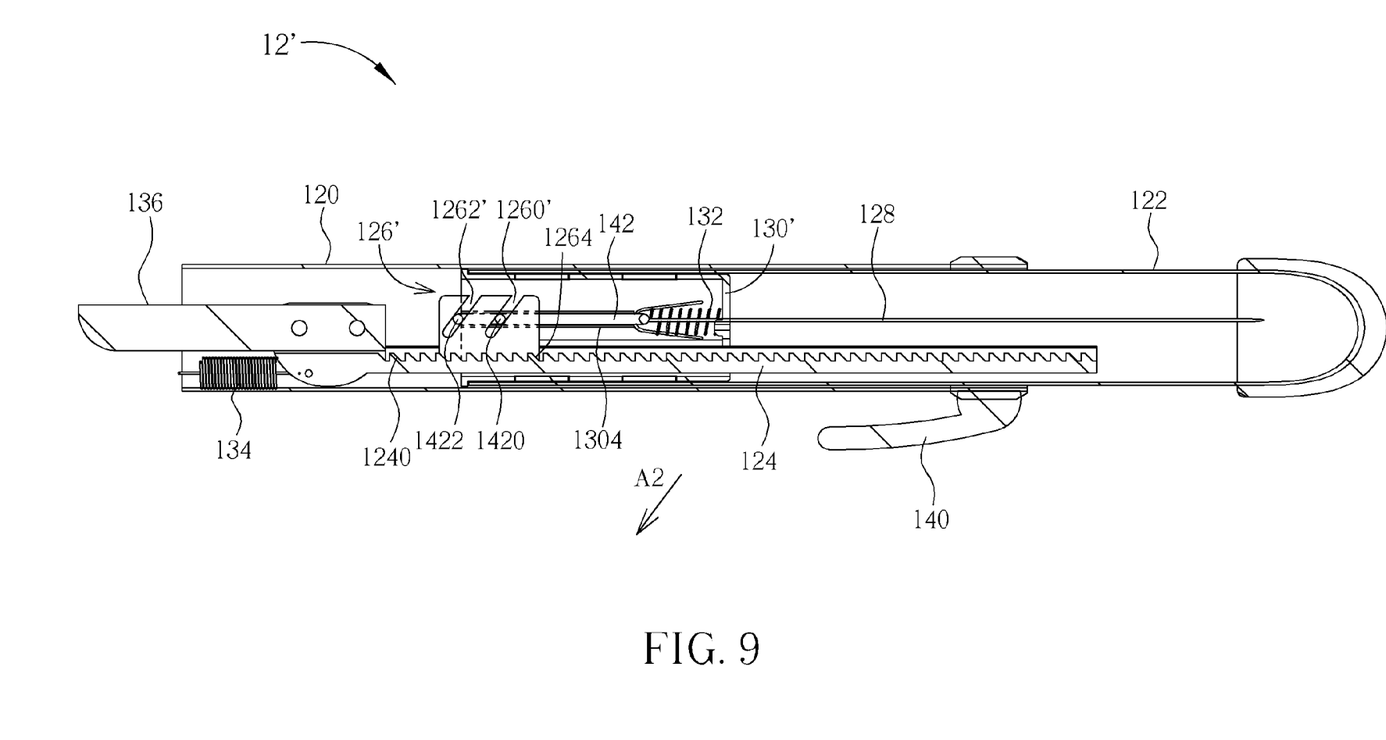
FIG. 9 is a cross-sectional view illustrating the second coupling member moving from the first position shown in FIG. 8 to a second position.
Figure 10:
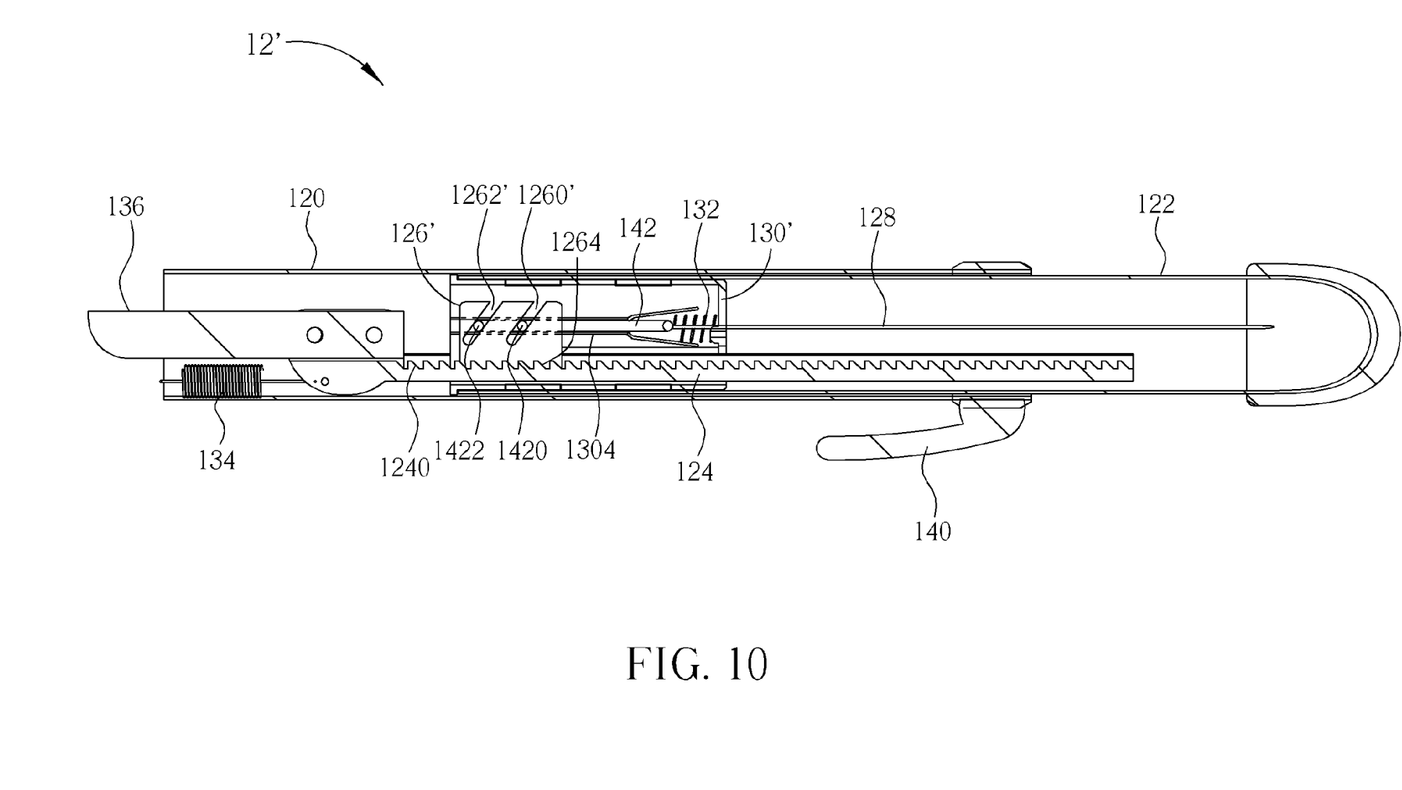
FIG. 10 is a cross-sectional view illustrating the first coupling member, the second coupling member, the engaging member and the guiding member moving together while the driving member is driven in FIG. 9.

Referring to FIGS. 7 to 10, FIG. 7 is an exploded view illustrating a telescoping handle assembly 12' according to another embodiment of the invention; FIG. 8 is a cross-sectional view illustrating one side of the telescoping handle assembly 12' shown in FIG. 7, wherein the second coupling member 126' is located at a first position; FIG. 9 is a cross-sectional view illustrating the second coupling member 126' moving from the first position shown in FIG. 8 to a second position; and FIG. 10 is a cross-sectional view illustrating the first coupling member 124, the second coupling member 126', the engaging member 136 and the guiding member 142 moving together while the driving member 128 is driven in FIG. 9. It should be noted that the same elements in FIGS. 7 to 10 and FIGS. 2 to 6 are represented by the same numerals, so the repeated explanation will not be depicted herein again.

The sleeve 130' of the telescoping handle assembly 12' has a guiding groove 1304 therein. The telescoping handle assembly 12' further comprises a guiding member 142 and the guiding member 142 has a first guiding portion 1420 and a second guiding portion 1422 adjacent to the first guiding portion 1420. The second coupling member 126' of the telescoping handle assembly 12' has a first slot 1260' and a second slot 1262' adjacent to the first slot 1260' formed thereon. As shown in FIG. 8, when the guiding member 142 and the second coupling member 126' are disposed in the sleeve 130', the guiding member 142 is disposed in the guiding groove 1304, and the first guiding portion 1420 and the second guiding portion 1422 are disposed in the first slot 1260' and the second slot 1262', respectively. In this embodiment, the first slot 1260' and the second slot 1262' both are oblique relative to the first coupling member 124.

An end of the driving member 128 passes through the sleeve 130' and is connected to the guiding member 142 such that the driving member 128 can be drawn to drive the guiding member 142 to move parallel to the first coupling member 124 along the guiding groove 1304 so as to drive the second coupling member 126' to move from a first position (as shown in FIG. 8) to a second position (as shown in FIG. 9) while the actuating member 138 is activated. As shown in FIG. 8, when the second coupling member 126' is located at the first position, the second coupling member 126' is disengaged from the first coupling member 124. As shown in FIGs. 9 and 10, when the second coupling member 126' is located at the second position, the second coupling member 126' is engaged with the first coupling member 124 through the second teeth 1264 and the first teeth 1240 such that the engaging member 136, the first coupling member 124, the second coupling member 126' and the guiding member 142 are capable of moving together while the driving member 128 is drawn.

As shown in FIG. 8, the resilient member 132 is slid over the end of the driving member 128, wherein one end of the resilient member 132 abuts against the guiding member 142 and the other end of the resilient member 132 abuts against an inner wall of the sleeve 130'.

It should be noted that the aforesaid telescoping handle assembly 12 of the stroller 1 shown in FIG. 1 can be replaced by the telescoping handle assembly 12' shown in FIGS. 7 to 10 and the operation of the telescoping handle assembly 12' is substantially similar to the telescoping handle assembly 12 except the aforesaid different structural design, so the repeated explanation will not be depicted herein again.

As mentioned in the above, when the driving member is driven, the second coupling member will be driven from the first position (e.g. disengaging position) to the second position (e.g. engaging position) such that the second coupling member, the first coupling member and the engaging member all begin to move together while the driving member is driven continuously. Consequently, the engaging member will be unlocked from the frame of the stroller. Then, the frame and the telescoping handle assembly can be folded up by one hand of the caretaker. On the other hand, when the driving member is released, the second coupling member will move from the second position to the first position such that the second coupling member is capable of moving with respect to the first coupling member. Afterward, the second handle is allowed to be freely adjusted within the first handle. Once the first handle and the second handle are locked together again, the second coupling member will be engaged with the first coupling member and the engaging member will be unlocked from the frame whenever the driving member is driven, regardless of the handle adjustment position between the first handle and the second handle. Accordingly, both the telescoping handle assembly and the one-hand fold mechanism can be implemented in the stroller of the invention so as to maximize the convenience, intuitive perception, aesthetic benefits and positive user-experience of the stroller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A telescoping handle assembly comprising:
a first handle;
a second handle, an end of the second handle being movably disposed in the first handle;
a first coupling member movably disposed in the first handle and the second handle;
an engaging member connected to the first coupling member;
a second coupling member movably disposed in the second handle; and
a driving member coupled to the second coupling member and used for driving the second coupling member to move from a first position to a second position;
wherein when the second coupling member is located at the first position, the second coupling member is capable of moving with respect to the first coupling member; when the second coupling member is located at the second position, the first coupling member and the second coupling member are capable of moving together while the driving member is driven.

2. The telescoping handle assembly of claim 1, wherein the first coupling member has a plurality of first teeth and the second coupling member has a plurality of second teeth such that the first coupling member and the second coupling member are capable of being engaged with each other through the first teeth and the second teeth.

3. The telescoping handle assembly of claim 1, wherein when the second coupling member is located at the first position, the second coupling member is disengaged from the first coupling member; when the second coupling member is located at the second position, the second coupling member is engaged with the first coupling member.

4. The telescoping handle assembly of claim 1, further comprising a sleeve disposed in the end of the second handle, the sleeve having a first guiding portion therein, the second coupling member having a first slot formed thereon, wherein the second coupling member is disposed in the sleeve and the first guiding portion is disposed in the first slot.

5. The telescoping handle assembly of claim 4, wherein the first slot is nonlinear such that the second coupling member is capable of moving in at least two directions relative to the first guiding portion.

6. The telescoping handle assembly of claim 4, wherein the sleeve further has a second guiding portion therein adjacent to the first guiding portion, the second coupling member further has a second slot formed thereon adjacent to the first slot, and the second guiding portion is disposed in the second slot.

7. The telescoping handle assembly of claim 6, wherein the first slot and the second slot both are nonlinear such that the second coupling member is capable of moving in at least two directions relative to the first guiding portion and the second guiding portion.

8. The telescoping handle assembly of claim 4, wherein an end of the driving member passes through the sleeve and is connected to the second coupling member such that the second coupling member is driven to move from the first position to the second position while the driving member is driven.

9. The telescoping handle assembly of claim 8, further comprising a resilient member slid over the end of the driving member, wherein one end of the resilient member abuts against the second coupling member and another end of the resilient member abuts against an inner wall of the sleeve.

10. The telescoping handle assembly of claim 1, further comprising a resilient member disposed in the first handle, wherein one end of the resilient member is connected to the first coupling member and another end of the resilient member is connected to the first handle.

11. The telescoping handle assembly of claim 1, further comprising an actuating member disposed on the second handle, wherein an end of the driving member is connected to the actuating member such that the driving member is driven to drive the second coupling member to move from the first position to the second position while the actuating member is activated.

12. The telescoping handle assembly of claim 1, further comprising a clamping device disposed on the first handle and used for locking or unlocking the second handle relative to the first handle.

13. The telescoping handle assembly of claim 1, further comprising a sleeve and a guiding member, the sleeve being disposed in the end of the second handle, the sleeve having a guiding groove therein, the guiding member having a first guiding portion, the second coupling member having a first slot formed thereon, wherein the guiding member and the second coupling member are disposed in the sleeve, the guiding member is disposed in the guiding groove, and the first guiding portion is disposed in the first slot.

14. The telescoping handle assembly of claim 13, wherein the first slot is oblique relative to the first coupling member.

15. The telescoping handle assembly of claim 13, wherein the guiding member further has a second guiding portion therein adjacent to the first guiding portion, the second coupling member further has a second slot formed thereon adjacent to the first slot, and the second guiding portion is disposed in the second slot.

16. The telescoping handle assembly of claim 15, wherein the first slot and the second slot both are oblique relative to the first coupling member.

17. The telescoping handle assembly of claim 13, wherein an end of the driving member passes through the sleeve and is connected to the guiding member such that the guiding member is driven to move parallel to the first coupling member so as to drive the second coupling member to move from the first position to the second position while the driving member is driven.

18. The telescoping handle assembly of claim 17, further comprising a resilient member slid over the end of the driving member, wherein one end of the resilient member abuts against the guiding member and another end of the resilient member abuts against an inner wall of the sleeve.

19. The telescoping handle assembly of claim 1, wherein the driving member is a cable disposed in the second handle, when the second coupling member is located at the second position, the first coupling member and the second coupling member are capable of moving together while the cable is drawn.

20. A stroller comprising:
a frame; and
a telescoping handle assembly comprising:
  a first handle;
  a second handle, an end of the second handle being movably disposed in the first handle;
  a first coupling member movably disposed in the first handle and the second handle;
  a second coupling member movably disposed in the second handle;
  an engaging member connected to the first coupling member and locked with the frame; and
  a driving member coupled to the second coupling member and used for driving the second coupling member to move from a first position to a second position;
  wherein when the second coupling member is located at the first position, the second coupling member is capable of moving with respect to the first coupling member such that the second handle is capable of moving with respect to the first handle; when the second coupling member is located at the second position, the first coupling member, the second coupling member and the engaging member are capable of moving together while the driving member is driven, so as to unlock the engaging member from the frame.

21. The stroller of claim 20, wherein the first coupling member has a plurality of first teeth and the second coupling member has a plurality of second teeth such that the first coupling member and the second coupling member are capable of being engaged with each other through the first teeth and the second teeth.

22. The stroller of claim 20, wherein when the second coupling member is located at the first position, the second coupling member is disengaged from the first coupling member; when the second coupling member is located at the second position, the second coupling member is engaged with the first coupling member.

23. The stroller of claim 20, wherein the telescoping handle assembly further comprises a sleeve disposed in the end of the second handle, the sleeve has a first guiding portion therein, the second coupling member has a first slot formed thereon, the second coupling member is disposed in the sleeve and the first guiding portion is disposed in the first slot.

24. The stroller of claim 20, wherein the telescoping handle assembly further comprises a resilient member disposed in the first handle, one end of the resilient member is connected to the first coupling member and another end of the resilient member is connected to the first handle.

25. The stroller of claim 20, wherein the telescoping handle assembly further comprises an actuating member disposed on the second handle, an end of the driving member is connected to the actuating member such that the driving member is driven to drive the second coupling member to move from the first position to the second position while the actuating member is activated.

26. The stroller of claim 20, wherein the telescoping handle assembly further comprises a clamping device disposed on the first handle and used for locking or unlocking the second handle relative to the first handle.

27. The stroller of claim 20, wherein the driving member is a cable disposed in the second handle, when the second coupling member is located at the second position, the first coupling member, the second coupling member and the engaging member are capable of moving together while the cable is drawn.

\* \* \* \* \*